United States Patent
Xu et al.

(10) Patent No.: US 12,395,439 B2
(45) Date of Patent: Aug. 19, 2025

(54) COLLABORATIVE TELEMETRY ENGINEERING

(71) Applicant: Cisco Technology, Inc., San Jose, CA (US)

(72) Inventors: Xinping Xu, Beijing (CN); David C. White, Jr., St. Petersburg, FL (US); John W. Garrett, Jr., Apex, NC (US); Mark Ammar Rayes, Alamo, CA (US); Joel Abraham Obstfeld, Bushey (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 26 days.

(21) Appl. No.: 17/977,740

(22) Filed: Oct. 31, 2022

(65) Prior Publication Data
US 2024/0146659 A1     May 2, 2024

(51) Int. Cl.
*H04L 47/10* (2022.01)
*H04L 41/06* (2022.01)
*H04L 41/16* (2022.01)
*H04L 43/0876* (2022.01)

(52) U.S. Cl.
CPC .............. *H04L 47/16* (2013.01); *H04L 41/06* (2013.01); *H04L 41/16* (2013.01); *H04L 43/0876* (2013.01)

(58) Field of Classification Search
CPC ......... H04L 47/16; H04L 41/06; H04L 41/16; H04L 43/0876
See application file for complete search history.

(56) References Cited

U.S. PATENT DOCUMENTS

| | | |
|---|---|---|
| 10,122,695 B2 | 11/2018 | Zhang et al. |
| 10,412,074 B2 | 9/2019 | Zhang et al. |
| 10,616,052 B2 | 4/2020 | Byers et al. |
| 11,115,280 B2 | 9/2021 | Shao et al. |
| 11,283,679 B2 | 3/2022 | Feltin et al. |

(Continued)

OTHER PUBLICATIONS

Cisco, Cisco Security Advisory, "Cisco IOS XR Software DVMRP Memory Exhaustion Vulnerabilities," https://tools.cisco.com/security/center/content/CiscoSecurityAdvisory/cisco-sa-iosxr-dvmrp-memexh-dSmpdvfz, Aug. 29, 2020, 10 pages.

(Continued)

*Primary Examiner* — Patrice L Winder
(74) *Attorney, Agent, or Firm* — Edell, Shapiro & Finnan, LLC

(57) ABSTRACT

Methods are provided for a collaborative, decentralized insight engineering based on exchanging telemetry vectors with peer network devices. Each network device independently detects a deviation in its functioning using machine learning of generated feature vectors. Specifically, the methods involve obtaining, from at least one peer network device, at least a first feature vector that represents at least one insight generated from telemetry data of a respective peer network device. The intermediate network device and the at least one peer network device are configured to forward packets of a traffic flow. The methods further involve determining whether a deviation related to one or more of the network devices, exists based at least on the first (Continued)

feature vector and performing the at least one predefined action based on determining that the deviation exists.

20 Claims, 8 Drawing Sheets

(56) References Cited

U.S. PATENT DOCUMENTS

| | | | | |
|---|---|---|---|---|
| 2010/0287128 | A1* | 11/2010 | Baltatu | H04L 45/02 709/224 |
| 2017/0230410 | A1 | 8/2017 | Hassanzadeh et al. | |
| 2018/0227210 | A1* | 8/2018 | Cosgrove | H04L 41/0893 |
| 2019/0042618 | A1 | 2/2019 | Potulska et al. | |
| 2019/0116131 | A1 | 4/2019 | Patil et al. | |
| 2019/0281078 | A1* | 9/2019 | Eguiarte Salazar | H04L 41/147 |
| 2022/0052905 | A1 | 2/2022 | Vasseur et al. | |
| 2022/0321588 | A1* | 10/2022 | Navon | H04L 63/1441 |
| 2022/0417120 | A1* | 12/2022 | Sesha | H04L 41/142 |
| 2023/0198946 | A1* | 6/2023 | Zacks | H04L 45/64 726/11 |
| 2023/0222395 | A1* | 7/2023 | Sesha | G06N 20/20 706/12 |
| 2023/0308374 | A1* | 9/2023 | Wang | H04L 41/16 |
| 2023/0336574 | A1* | 10/2023 | Rozenbaum | H04L 63/1425 |
| 2024/0097999 | A1* | 3/2024 | Sun | H04L 41/16 |

OTHER PUBLICATIONS

Cisco, Cisco Content Hub, Cisco Network Convergence System 560 Series Routers, "Use gRPC Protocol to Define Network Operations with Data Models," Cisco IOS XR Release 7.0.x, https://content.cisco.com/chapter.sjs?uri=/searchable/chapter/content/en/us/td/docs/iosxr/ncs5xx/programability/70x/b-programmability-cg-70x-ncs540/b-programmability-cg-70x-ncs540_chapter_011.html. XML, Jan. 12, 2020, 16 pages.

Wang, Q. et al., Research-Article, "Deep Learning Embeddings for Data Series Similarity Search," https://dl.acm.org/doi/10.1145/3447548.3467317, Aug. 14, 2021, 5 pages.

Bao, Y. et al., Session 6: Networks and Social Behavior, "SimGNN: A Neural Network Approach to Fast Graph Similarity," https://dl.acm.org/doi/10.1145/3289600.3290967, Jan. 30, 2019, 9 pages.

Kornblith, S. et al., Proceedings of Machine Learning Research, vol. 97, "Similarity of Neural Network Representations Revisited," http://proceedings.mlr.press/v97/kornblith19a.html, retrieved Jul. 14, 2022, 11 pages.

Putina, A. et al., "Online Anomaly Detection Leveraging Stream-Based Clustering and Real-Time Telemetry," IEEE Transactions on Network and Service Management, vol. 18, No. 1, Mar. 2021, 16 pages.

* cited by examiner

COLLABORATIVE TELEMETRY ENGINEERING

TECHNICAL FIELD

The present disclosure generally relates to data and communication networks.

BACKGROUND

Gathering telemetry data is a convenient way to monitor the performance of networking devices. Telemetry data, sometimes called "collection data" or "measurement data", are values obtained from monitoring performance by network devices. The telemetry data may include various information such as identifiers, timestamps, interfaces visited, queue depth, etc., for each network device the packet traverses along its path. A network sink device (the last network node along the path in the network) extracts the gathered telemetry data (in a form of metadata) from the received network packet and generates an export packet that includes the gathered metadata. The generated export packet is transmitted to a telemetry collector for analyzing the metadata to determine performance-related issues and/or to perform troubleshooting. The network controller may then reconfigure one or more network devices based on the analysis.

DETAILED DESCRIPTION

Overview

Figure 1:
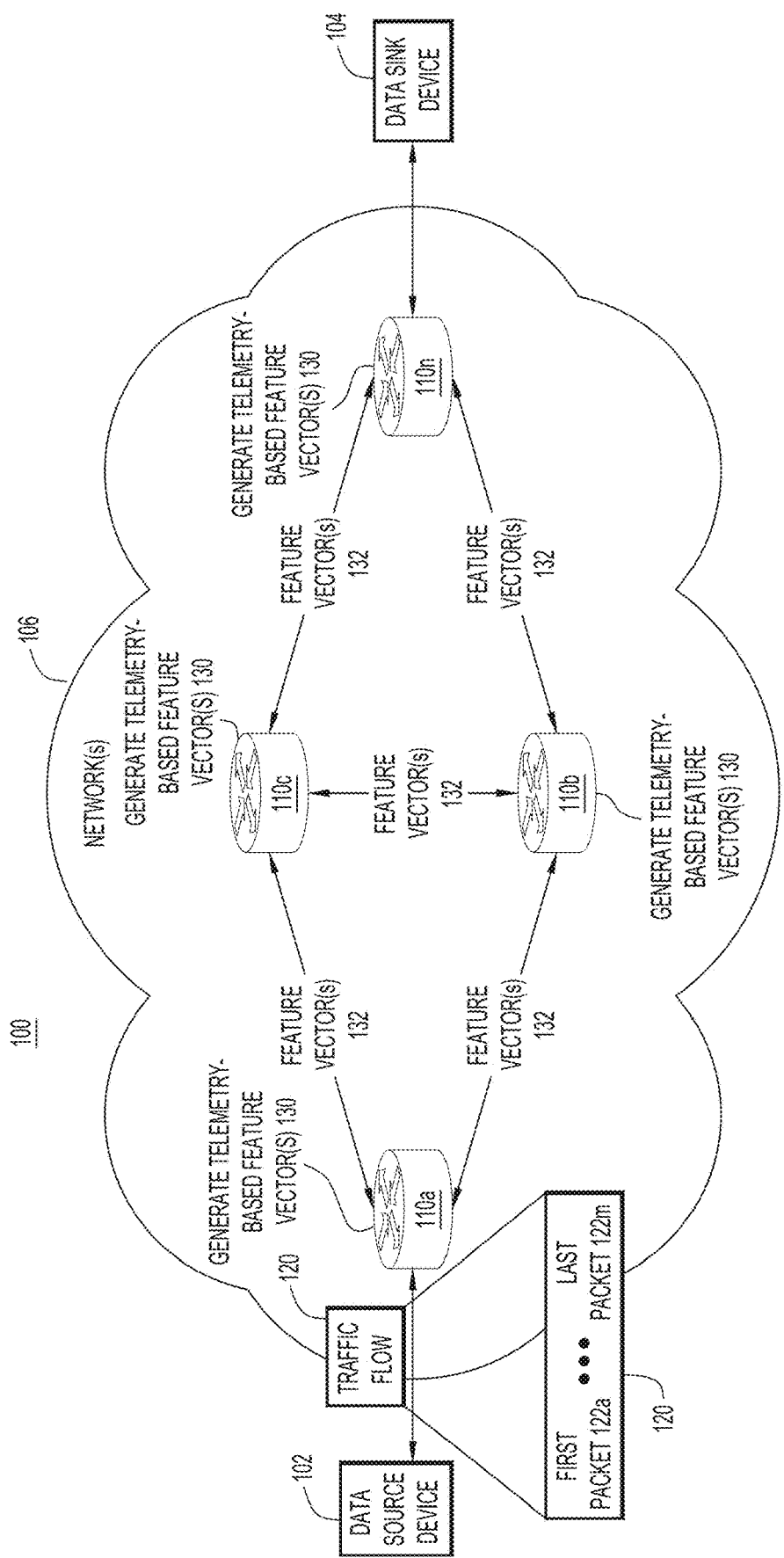
FIG. 1 is a block diagram illustrating a system in which peer network devices perform collaborative telemetry engineering, according to an example embodiment.

Techniques presented herein provide a collaborative approach to decentralized insight engineering based on exchanging feature vectors with peer network devices. Each network device independently detects a deviation in its functioning and/or functioning of one (or more) of its peer network devices using machine learning of the feature vectors.

In one form, an intermediate network device obtains, from at least one peer network device, at least a first feature vector that represents at least one insight generated from telemetry data of a respective peer network device. The intermediate network device and the at least one peer network device are configured to forward packets of a traffic flow. The intermediate network device determines whether to perform at least one predefined action based at least on the first feature vector and performs the at least one predefined action based on determining to perform the at least one predefined action.

In another form, the intermediate device obtains local telemetry data and generates at least one feature vector based on the local telemetry data. The at least one feature vector represents a function of the intermediate network device. The intermediate device provides, to at least one peer network device, the at least one feature vector for determining whether a predefined action is to be performed by the at least one peer network device. The intermediate network device and the at least one peer network device are configured to forward packets of a traffic flow.

Example Embodiments

When a network includes a network controller, telemetry data gathered from various networking devices are exported to one powerful server or the controller itself for various types of deep anomaly detection (DAD). However, when a network does not include a network controller or some other centralized device that can analyze telemetry data, DAD is not performed.

Techniques provided herein, while not limited to network deployments without a centralized controller or a centralized device, allow for DAD analysis of telemetry in network deployments without centralized network controllers. The techniques provide a collaborative approach of decentralized insight or telemetry engineering based on exchanging telemetry vectors with peer network devices. Each network device independently detects a deviation in its functioning (and/or the functioning of its peer(s)) using machine learning. The techniques coordinate DAD between various network devices on-demand, either on-box, or in-the-cloud without data-intensive processing by a powerful server, a centralized device, and/or a network controller.

Specifically, network devices maintain their raw telemetry data locally and generate feature vectors that represent insight or analysis of the local telemetry data that is indicative of a behavior of respective network devices. The network devices share feature vectors with one another. Each network device performs its own independent DAD or some other machine learning analysis using the feature vectors. Each network device then independently determines whether to perform at least one predefined action based on the analysis. For example, if a network device is significantly statistically diverged from peer network devices in terms of a meaningful set of values that may be obtained from a set of key sensors such as a meaningful set of telemetry data, then an alert may be generated that indicates the detected deviation. Additionally, the network device may perform rerouting of the traffic flow and/or may reconfigure itself, based on the detected deviation. Alerts and reconfiguring the respective network device are particularly useful actions for network security advisories and/or product support situations.

The techniques presented herein focus on various detections without predefined thresholds or known signatures. Each network device is configured to detect deviations or anomalies independently using machine learning (ML) such as ML-based clustering of the feature vectors representing its telemetry data (local telemetry data) and telemetry of its peer network devices (edge devices). The techniques provide a decentralized, collaborative learning of telemetry using DAD and/or a correlated view on a group of distributed network devices without involving any controllers and without exporting raw network telemetry data to the telemetry collector for analysis or sharing the raw network telemetry data with its peers. The techniques may be performed faster than the centralized, data intensive techniques and save on computational resources by simplifying the analysis process.

FIG. 1 is a block diagram illustrating a system 100 in which peer network devices perform collaborative telemetry engineering, according to an example embodiment.

In FIG. 1, the system 100 includes a data source device 102, a data sink device 104, a plurality of intermediate network devices 110a-n that transport packet flows from the data source device 102 to the data sink device 104 across one or more network(s) 106. This is only an example of the system 100, and the number and types of entities may vary based on a particular deployment and use case scenario, such as the type of service being provided and network structures of various network(s) 106.

In various example embodiments, the entities of the system 100 (the data source device 102, the data sink device 104, and the plurality of intermediate network devices 110a-n) may each include a network interface, at least one processor, and a memory. Each entity may be any programmable electronic device capable of executing computer readable program instructions. The network interface may include one or more network interface cards (having one or more ports) that enable components of the entity to send and receive data over the network(s) 106. Each entity may include internal and external hardware components such as those depicted and described in further detail in FIGS. 5 and 8. In one example, at least some of these entities may be embodied as virtual devices with functionality distributed over a number of hardware devices such as virtual switches, routers, etc.

The data source device 102 and the data sink device 104 may be a computer or client device or an endpoint that generates data based on input from an operator or may be a service running on a server that responds to requests or performs actions based on the requests.

The plurality of intermediate network devices 110a-n are transport or transit nodes that are configured to forward packets of various traffic flows. The intermediate network devices 110a-n include a network source device such as a first intermediate network device 110a, first and second transport network devices such as a second intermediate network device 110b and a third intermediate network device 110c, and a network sink device such as a fourth intermediate network device 110n. The plurality of intermediate network devices 110a-n may include, but are not limited to switches, routers, virtual switches, virtual routers, leaf nodes, spine nodes, etc. The plurality of intermediate network devices 110a-n include a central processing unit (CPU), a memory, a packet processing logic, an ingress interface, an egress interface, one or more buffers for storing various packets of various traffic flows, and one or more interface queues such as those depicted and described in FIG. 5. In one example, one or more of the intermediate network devices 110a-n may include hardware and software including container support under interwork operating system (IOS)-XR/XE and/or NX-OS.

The notation "a-n", "a-m", "a-k", "a-j", "a-h", "a-g", "a-p", "a-q", "a-x", "a-z", and the like denote that a number is not limited, can vary widely, and depend on a particular use case scenario. The number and type of intermediate network devices 110a-n may vary based on a particular deployment of the network(s) 106.

The network(s) 106 may include a network controller (not shown). The network controller, however, is not substantially involved in a collaborative telemetry engineering of one or more example embodiments. The network controller may configure the intermediate network devices 110a-n to monitor or stop monitoring one or more types of telemetry data. The network controller is not involved in detecting deviations and determining whether to perform one or more predefined actions. Further, no telemetry collector or a software application is needed to centrally store and/or analyze telemetry data to assess performance and perform troubleshooting. Analyzing telemetry data is distributed among the plurality of intermediate devices 110a-n and each device independently determines whether to perform one or more predefined actions.

A traffic flow 120 includes a plurality of packets 122a-m such as first packet 122a, . . . , last packet 122m. A packet includes a header and a payload that carries data such as commands, instructions, responses, information, etc. As the packets 122a-m traverse along the path through the network(s) 106, telemetry data is generated by the plurality of intermediate network devices 110a-n.

The telemetry data obtained along the path may include one or more of: (1) network device related information such as switch level information (switch identifier), (2) ingress related information such as ingress interface identifier and/or ingress timestamp(s), (3) egress related information such as egress interface identifier, egress timestamp(s), hop latency, egress port transmission link utilization, (4) buffer related information such as queue occupancy level as experienced by the respective network packet, (5) running average occupancy level, (6) number of packets, (7) number of virtual private network (VPN) clients, (8) number of wireless clients, (9) throughput rate, (10) memory utilization, etc. Telemetry data are data points that measure an attribute about performance and/or usage of the network device.

In the system 100, the intermediate network devices 110a-n are configured to forward the plurality of packets 122a-m of the traffic flow 120 and collect/monitor local telemetry data of its respective network device. The local telemetry data is indicative of a behavior of a respective intermediate network device. In related art, the telemetry data is added to the packets by a respective network device and the packet is transmitted to the next network device along the path. In an exemplary embodiment, raw telemetry data is locally processed by the respective network device to generate feature vectors. Specifically, the intermediate network devices 110a-n perform the following operations.

At 130, one or more telemetry-based feature vector(s) are generated based on the local telemetry data. In other words, each of the plurality of intermediate network devices 110a-n determines what type(s) of local telemetry data to monitor and collect based on operator settings, default settings, instructions from a software entity, etc. Each of the plurality of intermediate network devices 110a-n performs its own independent analysis of the respective local raw telemetry data to generate one or more vectors.

A vector (referred to as "telemetry-based vector", "feature vector", "telemetry-based feature vector", or "vector") may be a self-model of statistical behavior of time-series telemetry sensors on-box. The feature vector is post-processed information, analysis results, and/or summary of the collected, local, raw telemetry data. The feature vector represents an insight with respect to one or more features and/or functions of the respective network device e.g., throughput rate, buffer occupancy, congestion, computational power being utilized, etc. Insight provides information about the functioning and/or use of the respective network device (performance-related information) such as its health, load, etc. The feature vector may be a non-linear mapping or a neural network matrix of the local telemetry data. The feature vector represents high-level information about the local telemetry data. The respective network device independently analyzes collected local raw telemetry data and generates a summary or an insight based on the analysis, which is in a form of a feature vector.

At 132, the generated feature vectors are exchanged with peer network devices. That is, analysis of the telemetry data is distributed among the intermediate network devices 110a-n as opposed to being performed by a dedicated server or a network controller. As noted above, each intermediate network device locally processes its raw telemetry data and only provides results of the processing via the feature vector(s). That is, the intermediate network devices 110a-n only share the knowledge or insight generated from analyzing the raw telemetry data, in the form of feature vectors. Since each of the plurality of intermediate network devices 110a-n vectorizes the local raw telemetry data, no raw telemetry data is exchanged between network devices, preventing overload and/or congestion in the network(s) 106. In one example embodiment, the feature vectors 220a-z from respective network devices are provided to a local coordinator, the cloud, etc.

By way of a non-limiting example, the first intermediate network device 110a may provide at least first feature vector(s) to the immediate neighboring devices (its edges). The immediate neighboring devices are network devices that are directly connected to the first intermediate network device 110a such as the second intermediate network device 110b and the third intermediate network device 110c. The first intermediate network device 110a discovers the peer network devices that are directly connected thereto. Similarly, the second intermediate network device 110b may provide at least second feature vector(s) to its edges (directly connected devices) such as the first intermediate network device 110a, the second intermediate network device 110b, and the fourth intermediate network device 110n. That is, each network device discovers its immediate neighboring devices (its edges).

In yet another example, non-limiting, embodiment, the peer network devices may be network devices within the same enterprise domain (or sub domain) as the first intermediate network device 110a such that the first intermediate network device 110a provides its feature vector(s) to the peer network devices within its enterprise domain.

In yet another example, non-limiting, embodiment, the peer network devices may be defined as similarly functioning or similarly configured devices in a cloud, in the network(s) 106, in an enterprise domain, etc.

Which network devices are defined as peer network devices may vary based on a particular deployment and use case scenario. Network devices may be defined as peers based on operator-defined and/or system-defined groupings (e.g., similar use, function, etc.). Network devices may further perform a discovery process to find its peer network devices. Peer network devices may be defined differently for various types of telemetry data being monitored and collected. For example, the first intermediate network device 110a may be grouped in the same group as the fourth intermediate network device 110n with respect to temperature/heat related telemetry data but not with respect to congestion related telemetry data. As a result, the first intermediate network device 110a shares with the fourth intermediate network device 110n, feature vector(s) generated based on heat related telemetry data but not feature vector(s) generated based on congestion related telemetry data.

Network device groupings may be based on physical proximity (adjacent devices of the same type and/or in the same environment) where adjacent devices are discovered by a respective network device. Network device groupings may be based on logical proximity (next-hop IP device, which could be far away from the current network device), which may also be discovered by a respective network device. In other words, network groupings may vary. Various network device groupings may be deployed to gather performance metrics and health information to determine optimal paths for forwarding traffic flows. Network device grouping may be based on a common interest or concern (e.g., identified by a tag and/or topic). In one example embodiment, the network device groupings may consider physically close network devices of the same type to understand variances/anomalies.

In one example, the feature vectors are shared using Link Layer Discovery Protocol (LLDP) or some other data link layer protocol used for peer discovery. The feature vectors may be pulled via remote procedure calls such as gRPC i.e., provided on-demand or may be pushed periodically via publication and subscription messaging i.e., provided on-request, depending on a particular deployment and use case scenario. For example, cluster communications e.g., KAFKA, ETCD, and/or Remote Dictionary Server (REDIS) may be used for on-request implementation and Representational State Transfer (REST) Application Programming Interface (API) over Hypertext Transfer Protocol Secure (HTTPS) may be used when sharing to with the cloud.

Additionally, each of the plurality of intermediate network devices 110a-n performs its own independent analysis of the generated feature vector(s) for the local telemetry data and of the received feature vector(s) of its peer network devices. For example, by comparing the generated feature vector with the received feature vectors using machine learning, a deviation may be determined. Each of the plurality of intermediate network devices 110a-n detects deviations independently via self-learning with respect to peer network devices. The deviations are detected without requiring thresholds, etc. but by performing various machine learning such as graph similarity with an overall clustering view. The deviations represent a difference or a disparity between the functioning, operations, and/or use of one intermediate network device with respect to its peer network devices. For example, a deviation indicates an anomaly in use or performance of the network device e.g., an overload, congestion, failure in a port, overheat, etc.

According to one example embodiment, the first intermediate network device 110a assesses (via a deviation score) where it is on the overall distribution at any given time(t) on-box. The system 100 does not involve a large-scale on-box model training. The first intermediate network device 110a performs one or more similarity computations (e.g., via machine learning based clustering) on the representations or insights of telemetry time-series (e.g., feature vectors).

Based on the machine learning, the first intermediate network device 110a determines if one or more predefined actions are needed. The one or more predefined actions may involve execution-related actions such as traffic routing or rerouting decisions. The one or more predefined action may involve configuration-related actions such as generating alerts if a deviation is detected in the peer network device and not the first intermediate network device 110a. The one or more configuration-related action may include cluster failover, traffic rerouting, load sharing, reconfiguring connections, etc. The predefined actions may involve rule-based actions, routing-related actions, or policy-related actions.

Figure 2:
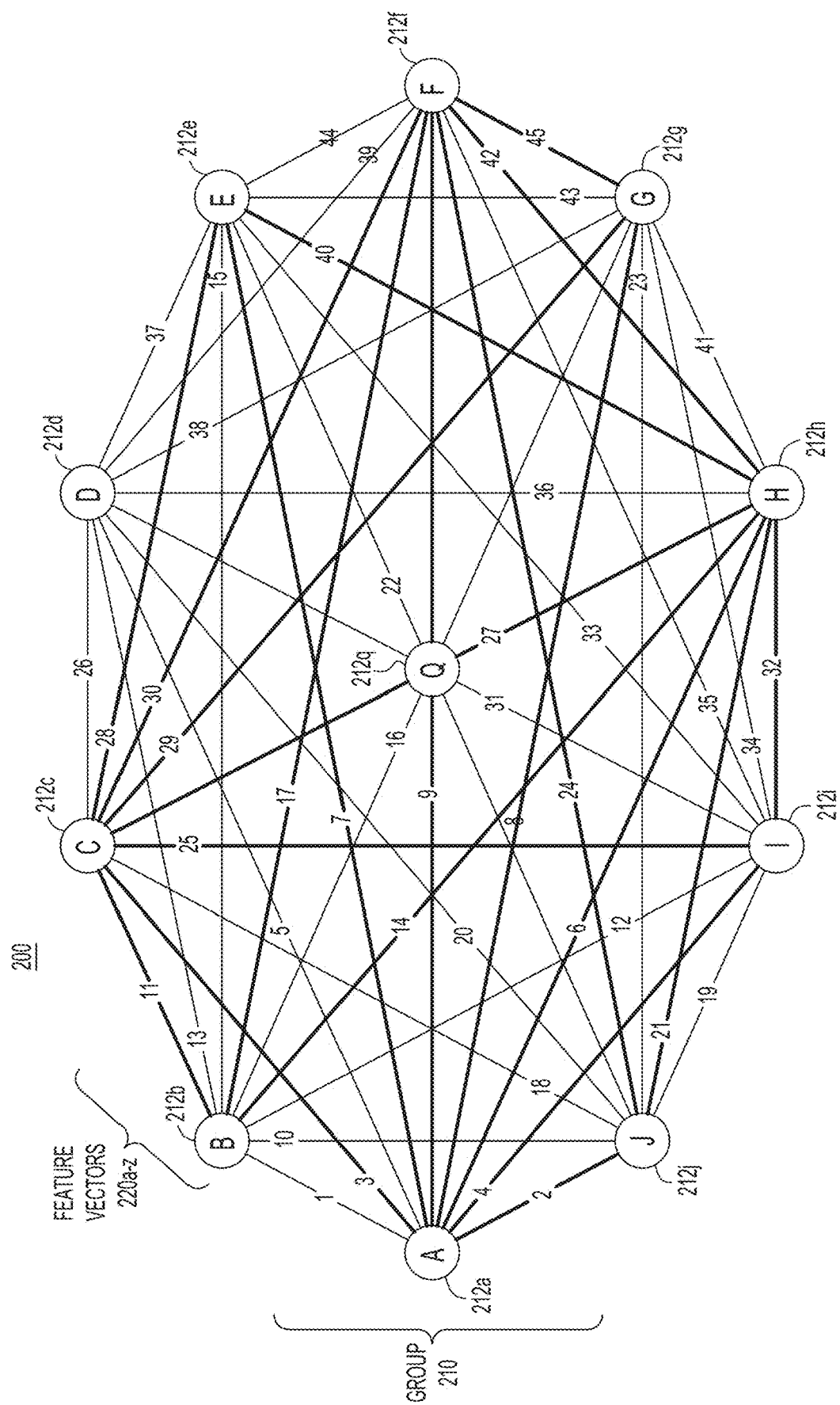
FIG. 2 is a diagram illustrating a system in which a deviation is determined based on collaborative telemetry engineering in a group of network devices, according to an example embodiment.

FIG. 2 is a diagram illustrating a system 200 in which a deviation is determined based on collaborative telemetry engineering in a group of network devices, according to an example embodiment.

The system 200 includes a group 210 of similarly functioning network devices 212a-q. The network devices 212a-q may be the plurality of intermediate network devices 110a-n of FIG. 1 e.g., routers or switches configured to forward packets of a traffic flow.

In the system 200, the group 210 includes a plurality of network devices 212a-q, eleven of which are shown in FIG. 2 such as a target network device 212q (the eleventh network device Q) and the other network devices such as a first network device 212a (A), a second network device 212b (B), a third network device 212c (C), a fourth network device 212d (D), a fifth network device 212e (E), a sixth network device 212f (F), a seventh network device 212g (G), an eight network device 212h (H), a ninth network device 212i (I), and a tenth network device 212j (J). The network devices 212a-q may be directly connected with one another, indirectly connected via one or more networks and/or other network devices, connected in the cloud, etc.

Since the network devices 212a-q are in the group 210 (grouped together as similarly functioning devices, for example), they exchange feature vectors 220a-z. Each network device obtains at least a first feature vector from the other network devices in the group 210. For example, the target network device 212q obtains a plurality of first feature vectors from each of the network devices 212a-j. The target network device 212q also generates a second feature vector from local telemetry data.

Since the group 210 of network devices 212a-q perform similar functions (e.g., routing traffic flow), they should generate common telemetry(x) time-series. As a result, the feature vectors 220a-z of the telemetry data such as non-linear mappings of telemetry(x) or neural network matrices should also be similar across these network devices 210a-q, under normal operating conditions. If the target network device 212q operates similarly to the other network devices 212a-j in the group 210, it is probably functioning properly. On the other hand, if there is an abnormality and/or irregularity in operations of the target network device 212q, the feature vector of the target network device 212q diverges from feature vectors of the other network devices 212a-j.

The target network device 212q determines a deviation by generating a graph of telemetry time-serials from ten feature vectors obtained from the other network devices 212a-j. The target network device 212q trains or performs machine learning with respect to the generated ten graphs in 45 pairs. The target network device 212q generates a similarity model that represents normal operations of the similarly functioning devices in the group 210 e.g., a local model of normality clustering for comparing various feature vectors.

If there is something wrong or unusual activity on the target network device 212q over time, then the target feature vectors (non-linear mappings or neural network matrices) diverge from others feature vectors of the other network devices 212a-j, allowing the target network device 212q to proactively identify the anomaly (e.g., overload, overheating, power failure, congestion, latency, malfunction, etc.).

It should be noted that the other network devices 212a-j also obtain feature vectors from each other and the target network device 212q. These devices independently determine the deviation occurring in the target network device 212q and generate an alert to the network devices in the group 210. Additionally, the other network devices 212a-j may reconfigure themselves to avoid the target network device 212q.

Figure 3:
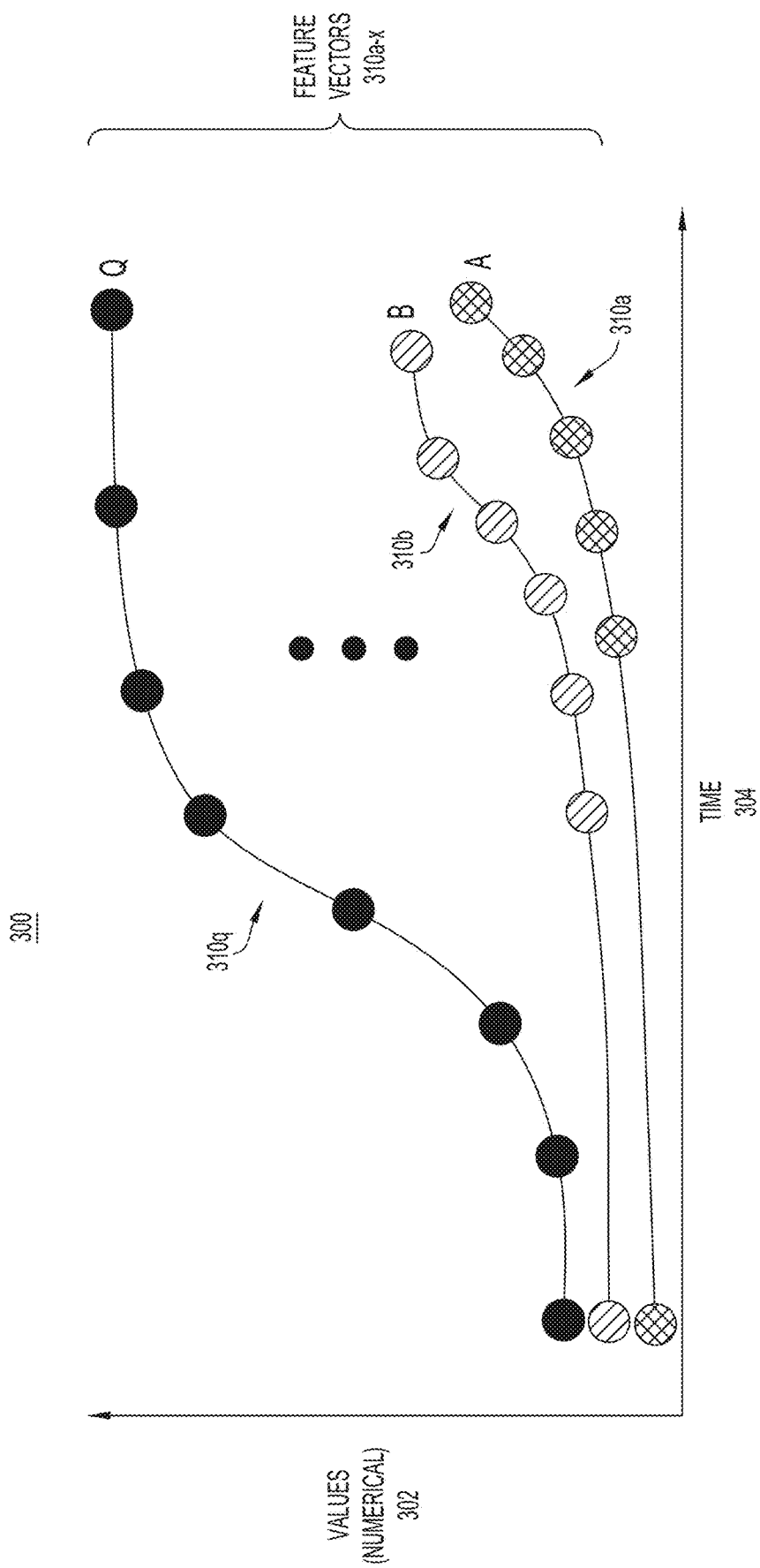
FIG. 3 is a view illustrating a model of feature vectors generated by an intermediate network device, according to an example embodiment.

With continued reference to FIGS. 1 and 2, FIG. 3 is a view illustrating a model 300 of feature vectors, that is generated by an intermediate network device, according to an example embodiment. The intermediate network device may be one of the intermediate network devices 110a-n of FIG. 1 or one of the network devices 212a-q of FIG. 2. The model 300 includes vector value(s) on a y-axis 302 (which may be a numerical value) and a time domain on the x-axis 304.

The model 300 is based on a plurality of feature vectors 310a-x such as a first vector 310a, a second vector 310b, and a third vector 310q. The first vector 310a is generated by a first network device (e.g., the first intermediate network device 110a of FIG. 1 or the first network device 212a of FIG. 2). The second vector 310b is generated by a second network device (e.g., the second intermediate network device 110b of FIG. 1 or the second network device 212b of FIG. 2). The third vector 310q is generated by a third network device (e.g., the third intermediate network device 110c of FIG. 1 or the target network device 212q of FIG. 2). In one example, the first vector 310a and the second vector 310b are obtained from peer network device and the third vector 310q is locally generated.

Using the model 300 (and comparing feature vectors thereon), the intermediate network device determines that the third vector 310q of the target network device 212q, for example, is dissimilar or located at a substantial distance from the other features vectors (e.g., the first vector 310a and the second vector 310b). In this example, the first vector 310a and the second vector 310b represent normal operations or standard functioning of the network devices. The third vector 310q obtains a low similarity score. Based on this distance or dissimilarity, a deviation in the performance of the target network device 212q is determined.

As noted above, the deviation may represent an anomaly such as congestion, overheating, or some other abnormality occurring in the target network device 212q. In other words, there is something wrong or unusual on the target network device 212q. The intermediate network device proactively identifies an anomaly on the target network device 212q. This, however, is just an example. The deviation may represent superior operations or functioning of the target network device 212q with respect to its peer network devices e.g., least congested device, fastest, most powerful, etc. In other words, the deviation represents an insight to the health of the target network device 212q, its functioning, use, etc. The deviation provides situational awareness and/or context awareness as to how the target network device 212q compares to its peer network devices. The model 300 provides visibility of the group 210 of network devices 212*a-q* to determine if one or more predefined actions are needed such as rerouting the traffic flow, reconfiguring the respective device, and/or making a routing decision.

In one or more example embodiments, each intermediate network device generates the model 300 (e.g., a graph) that represents telemetry time-serials (vector values on the y-axis 302 versus time domain on the x-axis 304). The model 300 may be a neural network representation. Each intermediate network device independently applies machine learning to feature vectors in a fully distributed manner and learns from the model 300 statistically significant deviations that provide context awareness (superior functioning, malfunction, congestion, etc.).

In one example embodiment, the intermediate network device may generate a plurality of models based on various types of feature vectors obtained from the peer network devices. For example, a first model may represent congestion of the similarly functioning network devices, a second model may represent memory use of the similarly functioning network devices, and a third model may represent computation power utilization of the similarly functioning network devices. The determined deviations may be analyzed independently or in aggregation to provide context awareness.

In one example embodiment, when network devices are cloud-managed, advanced machine learning may be applied in the cloud with knowledge or insights from network devices being managed within one enterprise, i.e., to centrally identify deviations in the cloud.

Yet, decentralized anomaly detection is particularly valuable e.g., for security advisories using telemetry data from traffic counters and/or for product assurance notices. Key sensors for detecting anomalies may be automatically identified within a network device, then the techniques may be applied across various network devices to identify key sensors, in terms of anomaly detection. The techniques do not require a global model of a general federated learning. Instead, edges (network devices) are self-organized and may directly interact with peer network devices for collaborative learning on-demand, without a central controller or a powerful server. The construction of the model 300 e.g., similarity graph with an overall clustering view has may advantages over traditional data intensive approaches, in terms of overhead and/or speed. The model 300 may be generated by applying various ML techniques (e.g., clustering, neural network representation, etc.).

Figure 4:
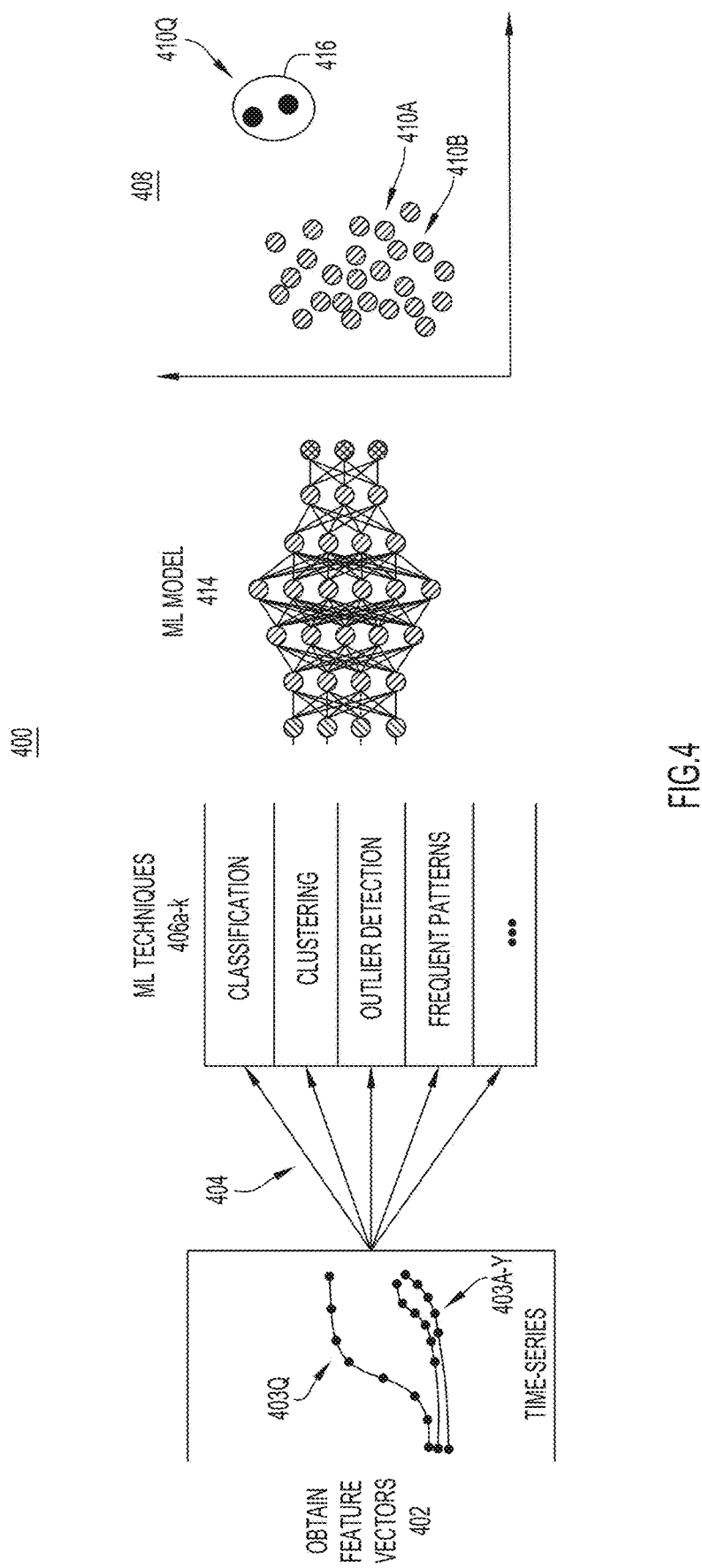
FIG. 4 is a flow diagram illustrating a method of determining that a deviation exists using various machine learning techniques, according to an example embodiment.

FIG. 4 is a flow diagram illustrating a method 400 of determining that a deviation exists using various machine learning techniques, according to an example embodiment. The method 400 is performed by an intermediate network device such as one of the intermediate network devices 110*a-n* of FIG. 1 or one of the network devices 212*a-q* of FIG. 2.

The method 400 involves at 402, the intermediate network device generating a first feature vector based on local telemetry data and obtaining, from peer network device, a plurality of second feature vectors that represent statistical behavior of respective peer network devices in a time-series domain. In this example, the intermediate network device and its peer devices function dissimilarly e.g., a target vector 403Q of intermediate network device is at a statistically significant distance from other vectors 403*a-y* of the peer devices.

The method 400 further involves at 404, the intermediate network device analyzing the plurality of vectors to select one or more of machine learning techniques 406*a-k*. The machine learning (ML) techniques 406*a-k* may include classification, clustering, outlier detection, frequent patterns, some hybrid approaches, etc. One of the machine learning techniques 406*a-k* is selected based on the type of telemetry data represented by the feature vectors, accuracy required, resources available, and/or time. It may be a balance between speed and accuracy based on the computational power or resources of the intermediate network device and time available for computing a machine learning model 414. Some of the machine learning techniques 406*a-k* may yield a rough approximation of similarities between network devices while others may accurately map similarities and differences between the network devices.

The method 400 further involves at 408, the intermediate network device analyzing outputs 410A-Q of the selected machine learning technique(s) (e.g., clustering, outlier detection, frequent patterns, etc.) to determine similarities and differences between the performance of the network devices. For example, first output 410A of a first network device A is approximately similar to second output 410B of a second network device B and are grouped together. The second output 410B and the first output 410A, may be representative of normal functioning of the network device e.g., typical number of client devices serviced by a network device. Since third output 410Q is statistically different, it shows a deviation e.g., abnormal functioning of a target network device Q, e.g., maximum number of client devices serviced by the target network device Q. The method 400 involves comparing the feature vectors on the machine learning model 414 and determining a deviation, depicted with a circle 416, using the machine learning model 414.

Figure 5:
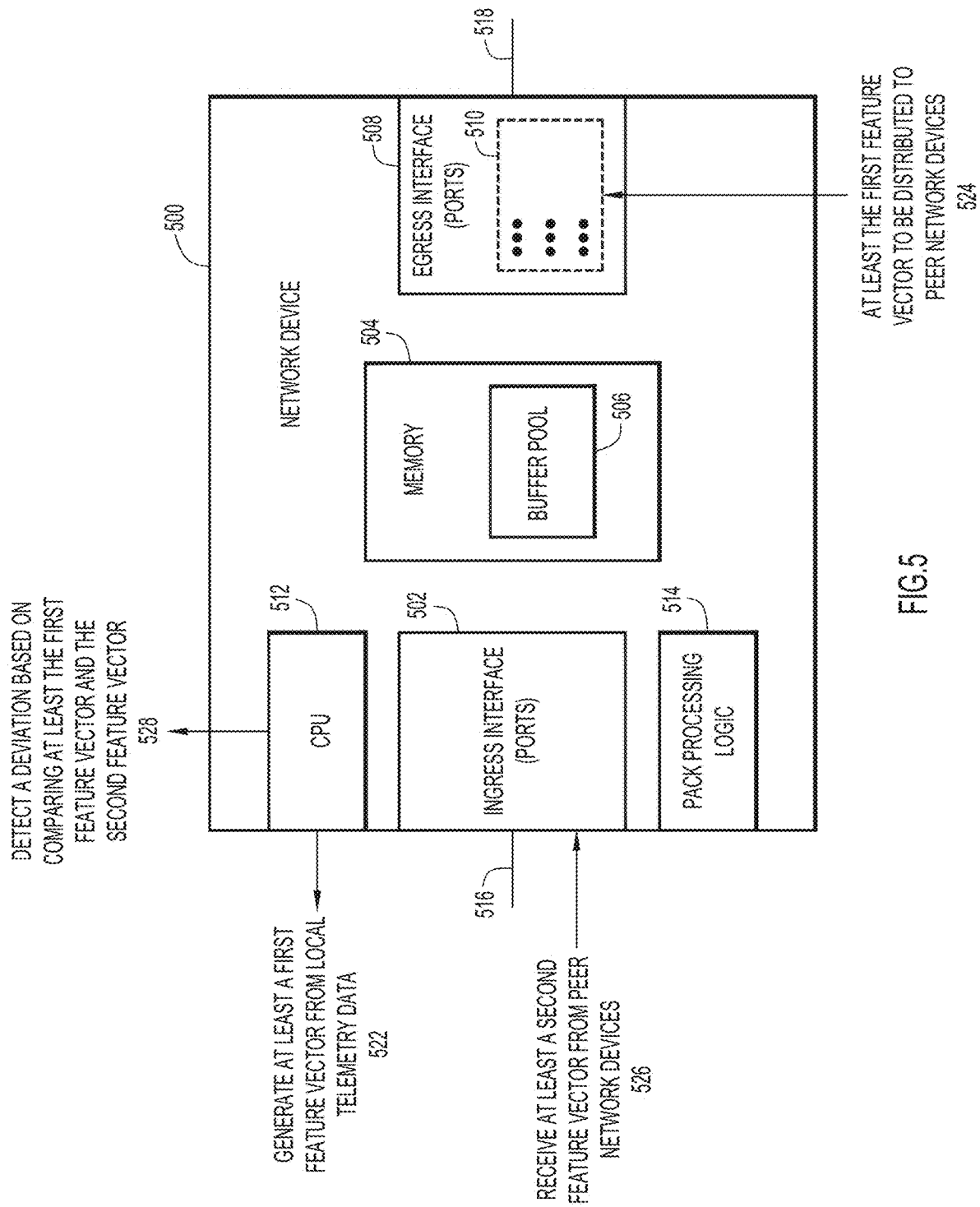
FIG. 5 is a diagram illustrating a network device that generates a feature vector and determines whether to perform a predefined action based on the feature vectors, according to an example embodiment.

FIG. 5 is a diagram illustrating a network device 500 that generates a feature vector and/or determines whether to perform a predefined action, according to an example embodiment. One example of the network device 500 is one of the intermediate network devices 110*a-n* of FIG. 1 or one of the network devices 212*a-q* of FIG. 2.

The network device 500 includes an ingress interface 502, a hardware memory 504 that includes a buffer pool 506 and flow table 524, and an egress interface 508 with an interface queue 510, a CPU 512, and a packet processing logic 514.

The ingress interface 502 (one or more ports) is configured to receive packets of various traffic flows and place them in the buffer pool 506 for processing. The buffer pool 506 may include one or more buffers (in the memory 504) that store the packets while various lookup operations and processing are performed at the network device 500. When the processing is completed, the packets are placed in the interface queue 510 associated with the egress interface 508. The egress interface 508 (one or more ports) is configured to transmit the packets to their next hop or the destination. The ingress interface 502 and the egress interface 508 are ports at which the network device 500 receives packets from the network and sends packets into the network.

The memory 504 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 504 may comprise one or more tangible (non-transitory) computer readable storage media (e.g., a memory device) encoded with software comprising computer executable instructions and when the software is executed (by the CPU 512) it is operable to perform certain network device operations described herein. That is, the memory 504 stores various instructions that are to be performed by the CPU 512.

The CPU 512 executes instructions associated with software stored in memory 504. Specifically, the memory 504 stores instructions for control logic that, when executed by the CPU 512, causes the CPU 512 to perform various operations on behalf of the network device 500 as described herein. The memory 504 may also store configuration information for operating and functioning of the network device 500. It should be noted that in some example embodiments, the control logic may be implemented in the form of firmware implemented by one or more ASICs. In some example embodiments, the CPU 512 may be a microprocessor or a microcontroller.

The packet processing logic 514 is representative of packet processing components in the network device 500 such as switch tables, switch fabric that operate to determine whether to drop, forward (and via a particular egress port), switch, etc. a particular packet based on contents in the header of the packet. The packet processing logic 514 may be implemented by one or more Application Specific Integrated Circuits (ASICs), etc.

The network device 500 obtains from a network link 516 via the ingress interface 502, a first network packet of a traffic flow. In one example, the first packet of the traffic flow may indicate telemetry elements (type of telemetry data) to monitor. Based on the foregoing, the network device 500 collects local telemetry elements or raw telemetry data. When a subsequent packet of a traffic flow is received via the ingress interface 502, the subsequent packet is stored in the buffer pool 506 for processing and forwarding to the next hop along the path.

At 522, the CPU 512 generates at least a first feature vector from local telemetry data. That is, the CPU 512 analyzes and/or processes the collected raw telemetry data to generate an insight with respect to the functioning and/or use of the network device 500. Multiple different first feature vectors may be generated for various telemetry elements or telemetry data types. Each first feature vector representing a different type of high-level information/attribute about performance or functioning of the network device 500 (e.g., one first feature vector for number of traffic flows handled by the intermediate network devices and one first feature vector for memory used).

At 524, the CPU 512, via the egress interface 508, transmits at least the first feature vector onto another network link 518, which is connected to one of the peer network devices. At 526, the CPU 512 receives, via the ingress interface 502, at least a second feature vector from the peer network devices. At 528, the CPU 512 determines whether a deviation is present based on statistically significant differences among the feature vectors.

In the techniques presented above, each network device is responsible for making its own decision and determine whether to perform predefined action, based on its own knowledge and based on information learned from peer network devices. Unlike the related art, where the telemetry data is generally aggregated by a collector or a controller, which analyzes aggregated telemetry data across the network and makes decisions for the network devices. Techniques presented herein provide a decentralize decision-making process and avoid transmitting raw telemetry data through the network. The raw telemetry data remains with the respective network device (at the edge) because each network device performs local processing and normalizing of the local telemetry data and exchanges analysis results in a form of feature vectors.

In the techniques presented above, each network devices uses these feature vectors (received and generated) to derive a local similarity model of normality clustering e.g., using one or more of the ML techniques (ML classification, ML clustering, ML outlier detection, frequency patterns, neural networks, some hybrid approach, etc.). Each network device determines its own (dis)similarity or distance to peer network devices (deviations) as well as whether one of the peer devices shows a deviation, based on its own feature vectors and the local similarity model. Each network device independently determines whether to perform at least one predefined action based on one or more deviations. Each network device determines which predefined actions to perform such as alert raising, cluster failover, load sharing, traffic re-routing or other routing decisions, client redistribution, etc.

The techniques presented above generate on-device telemetry engineering by leveraging local telemetry data from the device and processing the local telemetry data on the device itself. The post-processed result yields feature vectors of the statistical behavior of time-series telemetry sensors on-box. These feature vectors are then exchanged with peer devices to generate a similarity model of device performance/functioning/use with respect to its peer devices. Thereby, the devices locally process data (at the edge), share that post-processed data with others, and then generated a localized model. The devices thus perform a self-identification of anomalies that may occur in the device or its peers. Each device (with the broader wisdom of the network) determines predefined actions to perform if a deviation (anomaly) is detected.

Figure 6:
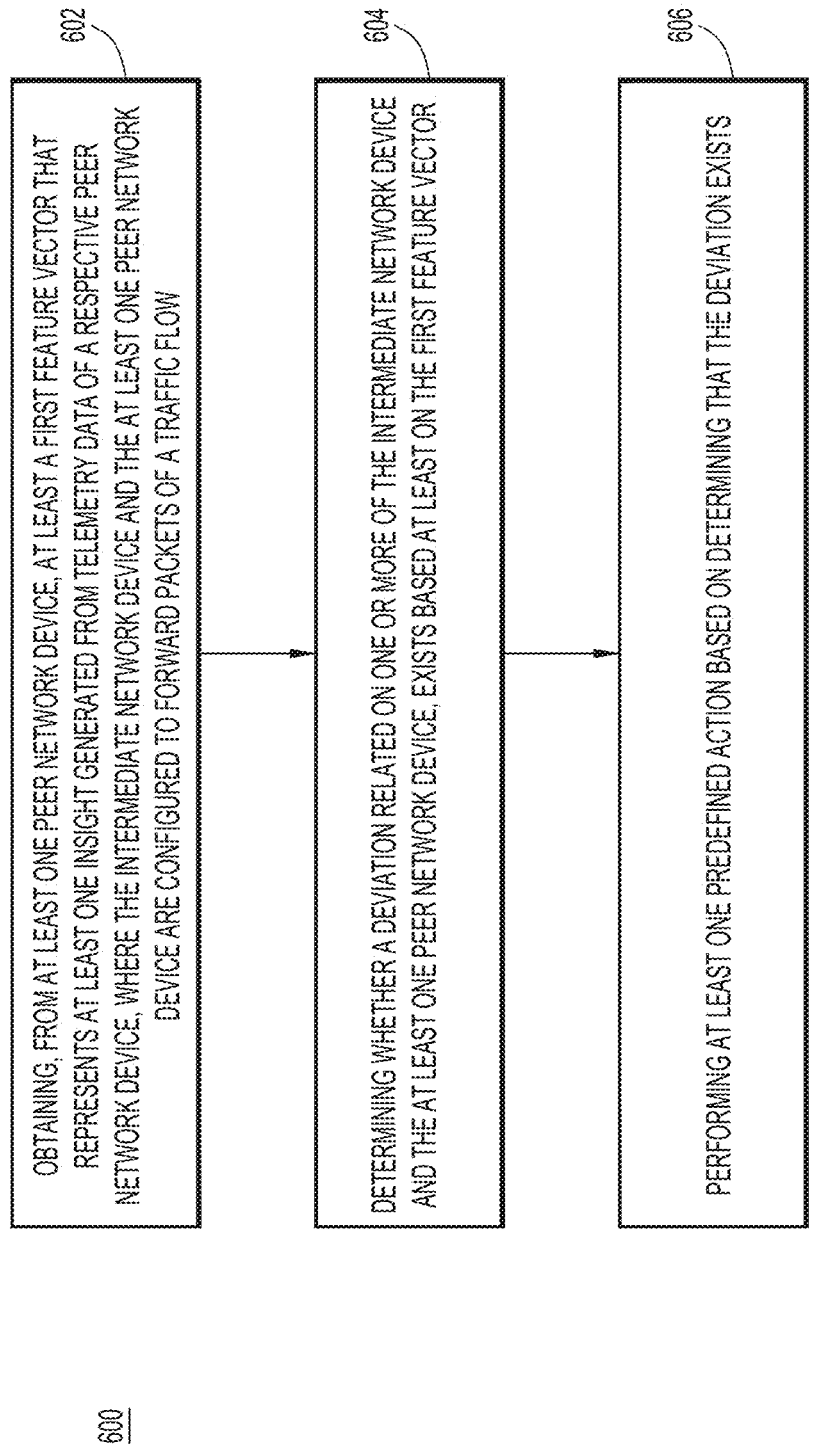
FIG. 6 is a flow diagram illustrating a method of performing at least one predefined action, according to an example embodiment.

FIG. 6 is a flow diagram illustrating a method 600 of performing at least one predefined action, according to an example embodiment. The method 600 is performed by an intermediate network device such as one of the intermediate network devices 110a-n of FIG. 1, one of the network devices 212a-q of FIG. 2, or the network device 500 of FIG. 5.

The method 600 involves, at 602, the intermediate network device obtaining, from at least one peer network device, at least a first feature vector that represents at least one insight generated from telemetry data of a respective peer network device. The intermediate network device and the at least one peer network device are configured to forward packets of a traffic flow.

The method 600 further involves at 604, the intermediate network device determining whether a deviation related to one or more of the intermediate network device or the at least one peer network device, exists based at least on the first feature vector and at 606, performing the at least one predefined action based on determining that the deviation exists.

In one form, the method 600 may further involve obtaining local telemetry data related to performance of the intermediate network device. The operation 604 of determining whether the deviation exists may be based on machine learning of the first feature vector and the local telemetry data. The at least one predefined action may include one or more of reconfiguring the intermediate network device, rerouting the traffic flow, or generating an alert that an anomaly in the intermediate network device or the at least one peer network device is detected.

In one instance, the first feature vector may be a first non-linear mapping of the telemetry data of the respective peer network device or a first neural network matrix of the telemetry data of the respective peer network device. The operation 604 of determining whether to the deviation exists may include generating at least a second feature vector from the local telemetry data related to the performance of the intermediate network device. The second feature vector may be a second non-linear mapping of the local telemetry data or a second neural network matrix of the local telemetry data.

According to one or more example embodiments, the operation 604 of determining whether the deviation exists may include comparing the first feature vector with the second feature vector using the machine learning to determine a deviation between the first feature vector and the second feature vector.

In another form, the at least one peer network device may include a plurality of intermediate peer network devices and at least the first feature vector may include a plurality of first feature vectors. Each of the plurality of first feature vectors may provide performance-related information of the respective peer network device.

In one instance, each of the plurality of first feature vectors may represent a statistical behavior of the respective peer network device in a time-series domain. The operation 604 of determining whether the deviation exists includes detecting the deviation between the plurality of first feature vectors by applying machine learning.

According to one or more example embodiments, the machine learning may involve one or more of: clustering the plurality of first feature vectors, generating a neural network representation of the plurality of first feature vectors, performing a pattern detection of the plurality of first feature vectors, performing a classification of the plurality of first feature vectors, or performing an outlier detection of the plurality of first feature vectors.

In another instance, the method 600 may further involve selecting a type of the machine learning to perform from a plurality of machine learning techniques based on a type of the telemetry data represented by the plurality of first feature vectors.

In yet another form, the operation 602 of obtaining the first feature vector may include one or more of discovering a plurality of peer network devices that are directly connected to the intermediate network device and obtaining at least the first feature vector from each of the plurality of peer network devices that are directly connected to the intermediate network device.

According to one or more example embodiments, the at least one peer network device may include a plurality of peer network devices that are within the same enterprise domain as the intermediate network device. The operation 602 of obtaining the first feature vector may include obtaining at least the first feature vector from each of the plurality of peer network devices.

Figure 7:
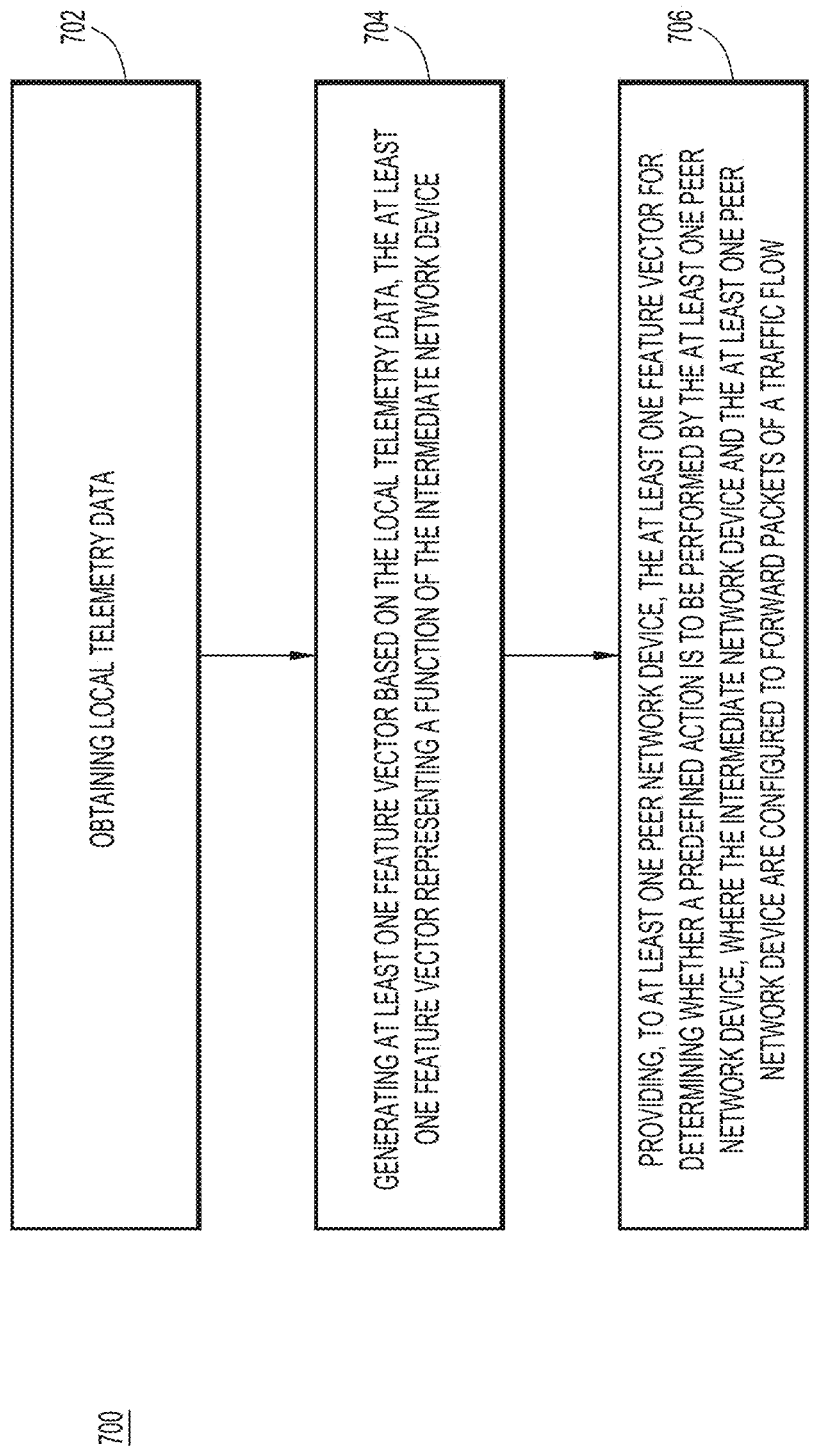
FIG. 7 is a flow diagram illustrating a method of providing the at least one feature vector to at least one peer network device, according to an example embodiment.

FIG. 7 is a flow diagram illustrating a method 700 of providing the at least one feature vector to at least one peer network device, according to an example embodiment. The method 700 is performed by an intermediate network device such as one of the intermediate network devices 110a-n of FIG. 1, one of the network devices 212a-q of FIG. 2, or the network device 500 of FIG. 5.

The method 700 involves, at 702, the intermediate network device obtaining local telemetry data and at 704, generating at least one feature vector based on the local telemetry data. The at least one feature vector represents a function of the intermediate network device.

The method 700 further involves, at 706, providing, to at least one peer network device, the at least one feature vector for determining whether a predefined action is to be performed by the at least one peer network device. The intermediate network device and the at least one peer network device are configured to forward packets of a traffic flow.

In one form, the operation 704 of generating the at least one feature vector may include analyzing the local telemetry data indicative of a behavior of the intermediate network device in a time-series domain and generating a non-linear mapping of the local telemetry data or a neural network matrix of the local telemetry data, which is expressed as the at least one feature vector.

In another form, the operation 704 of generating the at least one feature vector may include generating a plurality of feature vectors. Each of the plurality of feature vectors is generated based on a different type of the local telemetry data.

According to one or more example embodiments, the operation 706 of providing the at least one feature vector may include one or more of: providing the at least one feature vector to a first group of peer network devices that are directly connected to the intermediate network device, providing the at least one feature vector to a second group of peer network devices that are within same enterprise domain as the intermediate network device, or providing the at least one feature vector to a third group of peer network devices that are in a same grouping as the intermediate network device.

In one instance, the method 700 may further involve the intermediate network device obtaining from the at least one peer network device, at least one external feature vector that represents information about a respective peer network device and that is generated based on telemetry data of the respective peer network device. The method 700 may further involve the intermediate network device generating a performance model of the intermediate network device by applying machine learning to the at least one feature vector and the at least one external feature vector. The method 700 may further involve the intermediate network device determining a deviation in operations of the intermediate network device based on the performance model.

Figure 8:
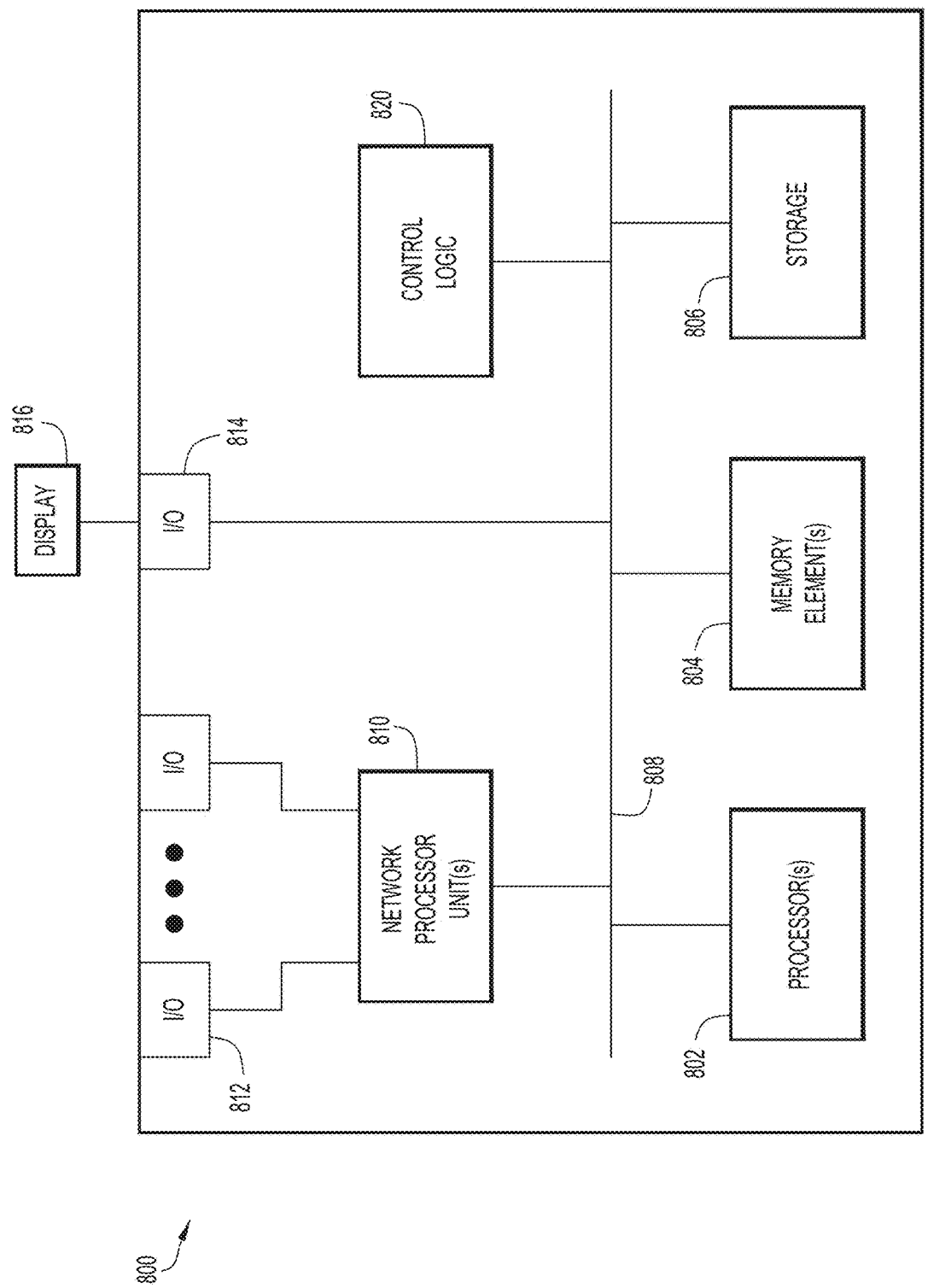
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1-7, according to various example embodiments, including, but not limited to, operations of the intermediate network devices 110a-n of FIG. 1, the network devices 212a-q of FIG. 2, or the network device 500 of FIG. 5. It should be appreciated that FIG. 8 provides only an illustration of one example embodiment and does not imply any limitations with respect to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 816, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform operations including obtaining, from at least one peer network device, at least a first feature vector that represents at least one insight generated from telemetry data of a respective peer network device. The apparatus and the at least one peer network device are configured to forward packets of a traffic flow. The operations further include determining whether a deviation related to one or more of the apparatus and the at least one peer network device, exists based at least on the first feature vector and performing the at least one predefined action based on determining to perform the at least one predefined action.

In yet another example embodiment, the apparatus includes a memory, a network interface configured to enable network communications, and a processor. The processor is configured to perform operations including obtaining local telemetry data and generating at least one feature vector based on the local telemetry data. The at least one feature vector represents a function of the apparatus. The operations further include providing, to at least one peer network device, the at least one feature vector for determining whether a predefined action is to be performed by the at least one peer network device. The apparatus and the at least one peer network device are configured to forward packets of a traffic flow.

In yet another example embodiment, one or more non-transitory computer readable storage media encoded with instructions are provided. When the media is executed by a processor, the instructions cause the processor to execute a method that includes obtaining, from at least one peer network device, at least a first feature vector that represents at least one insight generated from telemetry data of a respective peer network device. The at least one peer network device is configured to forward packets of a traffic flow. The method further includes determining whether a deviation related to one or more of the processor and the at least one peer network device, exists based at least on the first feature vector and performing the predefined action based on determining to perform the at least one predefined action.

In yet another example embodiment, one or more non-transitory computer readable storage media encoded with instructions are provided. When the media is executed by a processor, the instructions cause the processor to execute a method that includes obtaining local telemetry data and generating at least one feature vector based on the local telemetry data. The at least one feature vector represents a function of an intermediate network device. The method further includes providing, to at least one peer network device, the at least one feature vector for determining whether a predefined action is to be performed by the at least one peer network device. The intermediate network device and the at least one peer network device are configured to forward packets of a traffic flow.

In yet another example embodiment, a system is provided that includes the devices and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by an intermediate network device, local telemetry data indicative of performance of the intermediate network device;
    obtaining, by the intermediate network device from at least one peer network device, at least a first feature vector that represents at least one insight about a respective peer network device and is a mapping of a telemetry data of the respective peer network device or a neural network matrix of the telemetry data of the respective peer network device, wherein the intermediate network device and the at least one peer network device are configured to forward packets of a traffic flow;
    determining, by the intermediate network device, a presence or an absence of a deviation related to one or more of the intermediate network device or the at least one peer network device, based at least on the first feature vector and the local telemetry data; and
    performing, by the intermediate network device, at least one predefined action based on determining the presence of the deviation.

2. The method of claim 1, wherein determining the presence or the absence of the deviation is based on machine learning of the first feature vector and the local telemetry data, and
    wherein the at least one predefined action includes one or more of:
        reconfiguring the intermediate network device,
        rerouting the traffic flow, or
        generating an alert that an anomaly in the intermediate network device or the at least one peer network device is detected.

3. The method of claim 2, wherein the first feature vector is a first non-linear mapping of the telemetry data of the respective peer network device or a first neural network matrix of the telemetry data of the respective peer network device and wherein determining the presence or the absence of the deviation includes:
    generating at least a second feature vector from the local telemetry data related to the performance of the intermediate network device, wherein the second feature vector is a second non-linear mapping of the local telemetry data or a second neural network matrix of the local telemetry data.

4. The method of claim 3, wherein determining the presence or the absence of the deviation includes:
    comparing the first feature vector with the second feature vector using the machine learning to determine if the deviation exists between the first feature vector and the second feature vector.

5. The method of claim 1, wherein the at least one peer network device includes a plurality of intermediate peer network devices and at least the first feature vector includes a plurality of first feature vectors, each of the plurality of first feature vectors provides performance-related information of the respective peer network device.

6. The method of claim 5, wherein each of the plurality of first feature vectors represents a statistical behavior of the respective peer network device in a time-series domain and wherein determining the presence or the absence of the deviation includes:
  detecting the deviation between the plurality of first feature vectors by applying machine learning.

7. The method of claim 6, wherein the machine learning involves one or more of:
  clustering the plurality of first feature vectors,
  generating a neural network representation of the plurality of first feature vectors,
  performing a pattern detection of the plurality of first feature vectors,
  performing a classification of the plurality of first feature vectors, or
  performing an outlier detection of the plurality of first feature vectors.

8. The method of claim 7, further comprising:
  selecting a type of the machine learning to perform from a plurality of machine learning techniques comprising the clustering, the neural network representation, the pattern detection, the classification, and the outlier detection, based on a type of the telemetry data represented by the plurality of first feature vectors.

9. The method of claim 1, wherein obtaining the first feature vector includes one or more of:
  discovering, by the intermediate network device, a plurality of peer network devices that are directly connected to the intermediate network device; and
  obtaining at least the first feature vector from each of the plurality of peer network devices that are directly connected to the intermediate network device.

10. The method of claim 1, wherein the at least one peer network device includes a plurality of peer network devices that are within same enterprise domain as the intermediate network device and obtaining the first feature vector includes:
  obtaining at least the first feature vector from each of the plurality of peer network devices.

11. The method of claim 1, further comprising:
  generating a second feature vector based on the local telemetry data, wherein determining the presence or the absence of the deviation includes performing machine learning of the first feature vector and the second feature vector.

12. The method of claim 1, wherein the first feature vector is a first non-linear mapping of the telemetry data of the respective peer network device or a first neural network matrix of the telemetry data of the respective peer network device, and wherein determining the presence or the absence of the deviation includes:
  generating at least one second feature vector from the local telemetry data related to the performance of the intermediate network device, wherein the at least one second feature vector is a second non-linear mapping of the local telemetry data or a second neural network matrix of the local telemetry data.

13. The method of claim 1, wherein the local telemetry data includes data that measures one or more performance attributes of the intermediate network device.

14. A method comprising:
  obtaining, by an intermediate network device, local telemetry data indicative of performance of the intermediate network device;
  generating, by the intermediate network device, at least one feature vector based on the local telemetry data, the at least one feature vector representing a function of the intermediate network device and is in a form of a mapping of the local telemetry data or a neural network matrix of the local telemetry data; and
  providing, by the intermediate network device to at least one peer network device, the at least one feature vector for determining a predefined action that is to be performed by the at least one peer network device based on detecting a deviation using the at least one feature vector and respective telemetry data of the at least one peer network device, wherein the intermediate network device and the at least one peer network device are configured to forward packets of a traffic flow.

15. The method of claim 14, wherein generating the at least one feature vector includes:
  analyzing the local telemetry data indicative of a behavior of the intermediate network device in a time-series domain; and
  generating a non-linear mapping of the local telemetry data or the neural network matrix of the local telemetry data, which is expressed as the at least one feature vector.

16. The method of claim 14, wherein generating the at least one feature vector includes:
  generating a plurality of feature vectors, each of the plurality of feature vectors is generated based on a different type of the local telemetry data.

17. The method of claim 14, further comprising:
  obtaining, by the intermediate network device from the at least one peer network device, at least one external feature vector that represents information about a respective peer network device and that is generated based on telemetry data of the respective peer network device;
  generating, by the intermediate network device, a performance model of the intermediate network device by applying machine learning to the at least one feature vector and the at least one external feature vector; and
  determining, by the intermediate network device, the deviation in operations of the intermediate network device based on the performance model.

18. An apparatus comprising:
  a memory;
  a network interface configured to enable network communications; and
  a processor, wherein the processor is configured to perform operations comprising:
    obtaining local telemetry data related to performance of the apparatus;
    obtaining, from at least one peer network device, at least a first feature vector that represents at least one insight about a respective peer network device and is a mapping of a telemetry data of the respective peer network device or a neural network matrix of the telemetry data of the respective peer network device, wherein the apparatus and the at least one peer network device are configured to forward packets of a traffic flow;
    selecting a type of machine learning to perform from a plurality of machine learning techniques based on a type of the telemetry data represented by the first feature vector and the local telemetry data,
    determining a presence or an absence of a deviation related to one or more of the apparatus or the at least one peer network device, by performing selected machine learning of the first feature vector and the local telemetry data; and
    performing at least one predefined action based on determining the presence of the deviation.

19. The apparatus of claim 18,
wherein the at least one predefined action includes one or more of:
reconfiguring the apparatus,
rerouting the traffic flow, or
generating an alert that an anomaly in the apparatus or the at least one peer network device is detected.

20. The apparatus of claim 19, wherein the first feature vector is a first non-linear mapping of the telemetry data of the respective peer network device or a first neural network matrix of the telemetry data of the respective peer network device and wherein the processor is configured to determine the presence or the absence of the deviation by:
generating at least a second feature vector from the local telemetry data related to the performance of the apparatus, wherein the second feature vector is a second non-linear mapping of the local telemetry data or a second neural network matrix of the local telemetry data.

\* \* \* \* \*